No. 824,656. PATENTED JUNE 26, 1906.
J. W. HOWE.
FLOOR SCRUBBING MACHINE.
APPLICATION FILED AUG. 9, 1905.
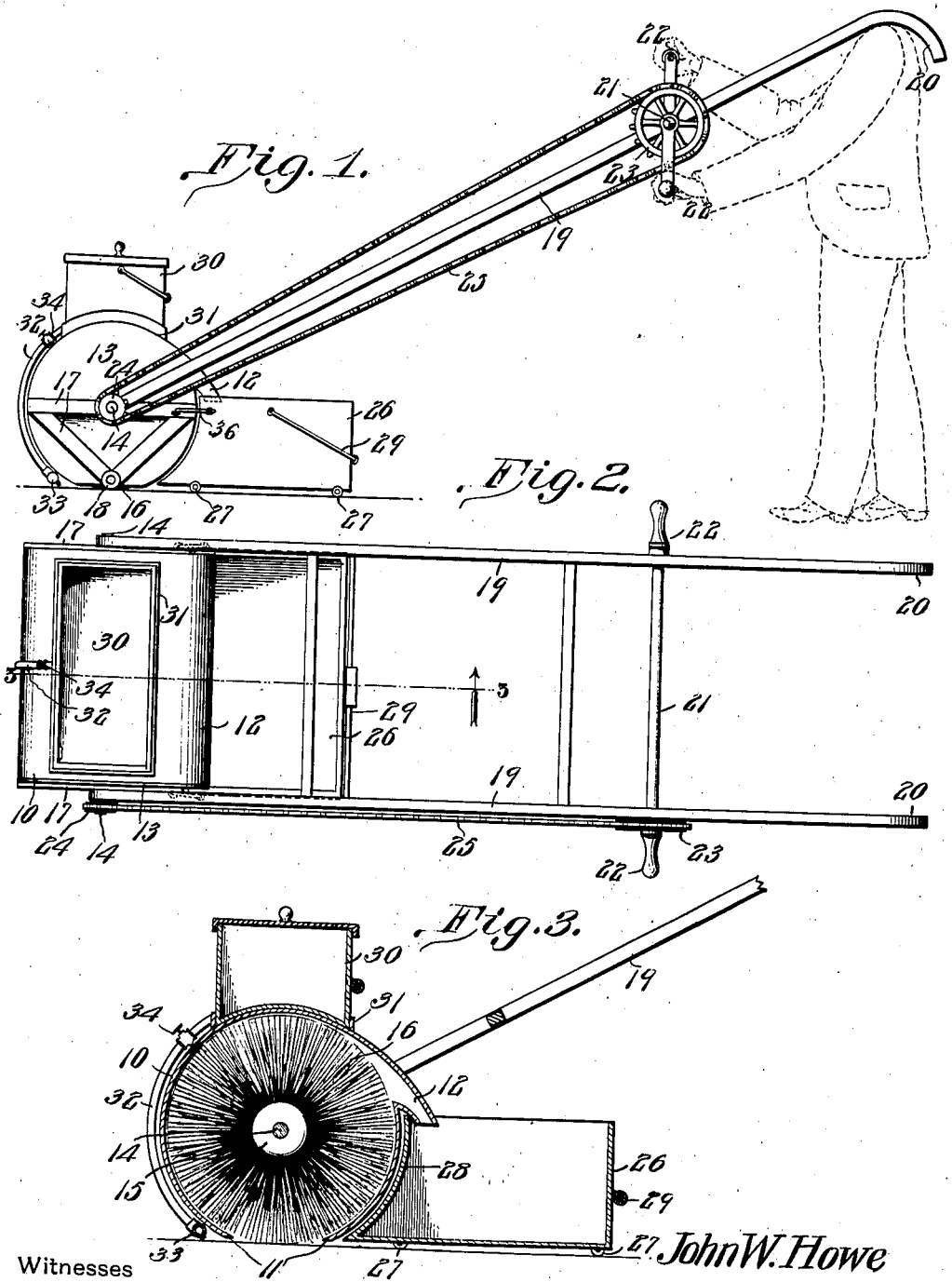
Witnesses
John W. Howe
Inventor
by C. A. Snow & Co.
Attorneys

UNITED STATES PATENT OFFICE.

JOHN WILLIAM HOWE, OF SPANGLE, WASHINGTON.

FLOOR-SCRUBBING MACHINE.

No. 824,656.　　　Specification of Letters Patent.　　　Patented June 26, 1906.

Application filed August 9, 1905. Serial No. 273,406.

*To all whom it may concern:*

Be it known that I, JOHN WILLIAM HOWE, a citizen of the United States, residing at Spangle, in the county of Spokane and State of Washington, have invented a new and useful Floor-Scrubbing Machine, of which the following is a specification.

This invention relates to improvements in floor-scrubbing apparatus, and has for its object to improve the construction and increase the efficiency of devices of this character.

With these and other objects in view the present invention consists in the combination and arrangement of parts, as will be hereinafter fully described, shown in the accompanying drawings, and particularly pointed out in the appended claim.

In the drawings, Figure 1 is a view in side elevation of the improved scrubbing-machine in operative position. Fig. 2 is a top plan view of the improved scrubbing-machine. Fig. 3 is a sectional view on line 3 3 of Fig. 2.

Like characters of reference designate corresponding parts throughout the several views.

In its preferred embodiment the improved scrubbing-machine forming the subject-matter of this application comprises an approximately cylindrical brush-housing 10, open at the bottom, as at 11, and having a tangential chute 12, extending rearwardly and downwardly therefrom. The ends of the housing 10 are closed by disk-like cover members 13, having central openings in which is journaled the shaft 14, forming the axis of the block 15, which forms the base for holding the fibers of the brush 16.

The end disks 13 are provided with strengthening-strips 17 and with caster-wheels, one of which is shown at 18, for supporting the housing and its brush.

For operating the machine a pair of handles 19 are pivoted upon the shaft 14 exteriorly of the strips 17 and end disks 13 and extending rearwardly therefrom terminate in down-curved ends 20, adapted to rest upon the shoulders of the operator, as shown in Fig. 1. Upon the handles 19 is mounted a transverse shaft 21, which is provided at its ends outside the handles with oppositely-extending crank-arms 22. Any approved means of communicating motion from the shaft to the brush may be employed, and here shown as a sprocket 23 upon the shaft 21, a sprocket 24 upon the shaft 14, and a chain 25 mounted upon the two sprockets.

Disposed rearwardly of the housing 10 is a receptacle 26, with the side next the housing curved to correspond to the same and bearing at the upper edge of the curved side beneath the chute 12, as shown at 35. The receptacle 26 is provided with casters 27 and a bail 29 and is detachably connected to the housing 10 by hooks 36. The housing is supported upon its casters 18 at the lower part, while the rear upper part is supported by the curved wall of the receptacle, bearing beneath the chute 12 and held in place by the hooks 36. The receptacle thus performs two important functions—first, as a receptacle for the water and other material carried upward and over by the brush, and, second, as a partial support to the housing and its brush and other attachments to retain them in operative position. When the receptacle is to be detached for discharging its contents, the hooks 36 are disconnected and the housing tilted to release the chute and the receptacle wheeled away on its casters to be discharged or conveyed by its bail 29. When again required for use, the parts are recoupled, as before.

A removable reservoir 30 is mounted upon the housing and retained thereon in any approved manner, as by the upstanding lip 31. The reservoir is provided with a discharge-pipe 32, having a transversely-disposed sprinkling-nozzle 33, disposed immediately in front of the brush and to clear the floor, and a valve 34 to control the flow of water.

To operate the device, the reservoir 30 is filled with water, either clear or soapy, as found desirable. The valve 34 is then opened, permitting the water to flow through the pipe 32 and discharge-nozzle 33. The handles are then placed with the curves 20 bearing upon the shoulders of the operator, who grasps the cranks 22, and while in an upright position advances, turning the cranks. The rotation of the cranks rotates the brush, which scrubs the floor and carries the dirty water to and discharges it into the chute and from there to the receptacle 26. It will thus be seen that by simply walking ahead and turning the cranks, conveniently disposed, the whole process of scrubbing and drying the floor is performed.

Having thus described the invention, what is claimed is—

A device of the class described, comprising a housing having an opening in the bottom and a tangentially-disposed discharge-chute extending rearwardly therefrom, strengthening devices attached to the ends of said housing, a shaft journaled in said strengthening devices and extending through said housing, a brush carried by said shaft within said housing and operating through the aperture therein, spaced handles swinging from said shaft at opposite sides of said housing, means carried by said handles for operating said shaft and the brush mounted thereon, a receptacle disposed rearwardly of said housing and with one edge bearing beneath said chute, and means for detachably coupling the receptacle to the housing.

In testimony that I claim the foregoing as my own I have hereto affixed my signature in the presence of two witnesses.

JOHN WILLIAM HOWE.

Witnesses:
 ALICE SULLIVAN,
 OLIVER W. NEWLON.